United States Patent
Deshmukh et al.

(10) Patent No.: US 11,075,792 B2
(45) Date of Patent: Jul. 27, 2021

(54) SCALABLE AND ROBUST NETWORK MANAGEMENT FOR CLOUD-BASED NAT ENVIRONMENTS

(71) Applicant: Juniper Networks, Inc., Sunnyvale, CA (US)

(72) Inventors: Raviraj Satish Deshmukh, Pune (IN); Rahamath Sharif, Bangalore (IN); Praveen BK, Bangalore (IN); Gireesh Kumar Maguluru, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/803,935

(22) Filed: Feb. 27, 2020

(65) Prior Publication Data

US 2021/0203542 A1 Jul. 1, 2021

(30) Foreign Application Priority Data

Dec. 26, 2019 (IN) .............................. 201941053895

(51) Int. Cl.
*H04L 12/24* (2006.01)
*H04L 29/12* (2006.01)
(Continued)

(52) U.S. Cl.
CPC .......... *H04L 41/0213* (2013.01); *G06F 9/547* (2013.01); *H04L 41/0806* (2013.01); *H04L 61/2007* (2013.01); *H04L 61/2514* (2013.01); *H04L 67/025* (2013.01); *H04L 67/146* (2013.01); *H04L 67/40* (2013.01)

(58) Field of Classification Search
None
See application file for complete search history.

(56) References Cited

U.S. PATENT DOCUMENTS

2015/0280959 A1* 10/2015 Vincent ............... H04L 67/1097
709/203
2016/0270145 A1* 9/2016 Srinivasa Gopalan .....................
H04L 65/1083

(Continued)

OTHER PUBLICATIONS

Harrington et al., "An Architecture for Describing Simple Network Management Protocol (SNMP) Management Frameworks," RFC 3411, Network Working Group, Internet Engineering Task Force (IETF), Dec. 2002, 64 pp.

(Continued)

*Primary Examiner* — Jeffrey R Swearingen
(74) *Attorney, Agent, or Firm* — Shumaker & Sieffert, P.A.

(57) ABSTRACT

Scalable, robust cloud-based network management systems (NMSs) are described. In one, an NMS includes a set of NMS applications, a pool of device communication managers (DCMs), and a pool of device operations managers (DOMs). Each of the DCMs and DOMs executed by the processors as software containers. The NMS includes an API gateway configured to route remote procedure calls (RPCs) from the DCMs to the DOMs via the APIs exposed by the DOMs and according to device identifiers of the managed elements. The DOMs are configured to establish a set of persistent application-layer communication sessions from the DOMs to the DCMs and to direct communications from the NMS applications to the DCMs over the persistent application-layer communication sessions according to a mapping between device identifiers associated with the managed elements and network addresses associated with the DCMs.

13 Claims, 4 Drawing Sheets

(51) Int. Cl.
      H04L 29/06       (2006.01)
      H04L 29/08       (2006.01)
      G06F 9/54        (2006.01)

(56)              References Cited

OTHER PUBLICATIONS

Enns et al., "Network Configuration Protocol (NETCONF)," RFC 6241, Internet Engineering Task Force, IETF, Jun. 2011, 113 pp.
Richardson et al. "Microservices—from Design to Deployment", Nginx, Inc., May 18, 2016, 80 pp.
"HTTP Load Balancing," Nginx Docs, Nginx Inc., Retrieved Dec. 22, 2019, from: https://docs.nginx.com/nginx/admin-guide/load-balancer/http-load-balancer/, accessed Oct. 13, 2020, 18 pp.
Gajek, "API Diversity for Microservices in the Domain of Connected Vehicles" Master Thesis, University of Stuttgart, May 3, 2018, 95 pp.
Extended Search Report from counterpart European Application No. 20175874.5, dated Nov. 6, 2020, 8 pp.

* cited by examiner

SCALABLE AND ROBUST NETWORK MANAGEMENT FOR CLOUD-BASED NAT ENVIRONMENTS

This application claims the benefit of Indian Provisional Patent Application 201941053895, filed Dec. 26, 2019, the entire content of which is incorporated herein by reference.

TECHNICAL FIELD

This disclosure relates to computer networks and, more particularly, to network management systems for configuring and managing network devices.

BACKGROUND

A computer network is a collection of interconnected computing devices that can exchange data and share resources. In a typical cloud-based computing environment, a large collection of interconnected servers provides computing and/or storage capacity for execution of various applications and services for customer networks. In most cloud computing environments, clusters of storage systems and application servers are interconnected via high-speed packet-switched network that typically includes routers, switches, gateways, firewalls, and a variety of other devices to provide and facilitate network communication.

Network devices, also referred to herein as network elements, typically include mechanisms, such as management interfaces, by which administrators are able to locally or remotely configure the devices. By interacting with the management interface, various clients, such as human users, automated scripts or network management systems (NMS), can perform configuration tasks as well as collect and view operational data of the managed devices. For example, a network management system often provides a centralized repository storing and deploying configuration data and policies to the managed devices to, as examples, configure of hardware components of the devices, adjust parameters for supported network protocols, specify physical components within the device, modify routing information maintained by a router, access software modules and other resources residing on the device, and perform other configuration tasks. In addition, the network management system may receive information either by polling the managed device or by receiving asynchronous events from the devices. For example, the management interfaces of the managed device may be used by the NMS to access current operating parameters, system logs, information related to network connectivity, network activity or other status information for the devices, allowing clients to view and react to event information received from the devices.

Management of cloud-based computing environment by NMSs presents certain technical challenges, especially as the size of such computing environments may grow massively in scale such to host thousands or millions of managed network devices.

SUMMARY

In general, this disclosure describes scalable, robust techniques and systems for network management of devices using cloud-based network management systems (NMSs). The techniques may be particular useful for network environments in which device-initiated management sessions are utilized and/or where network addresses for the managed elements are subject to frequent change, such as when the NMS and the managed elements are separated by a network address translation (NAT) service or device.

Various examples are described in which the cloud-based NMS utilizes a plurality of NMS microservices to provide NMS services to respective to managed network elements. Moreover, techniques are described in which two types of microservice containers work in tandem to handle management sessions for the network elements. Each type of microservice may be deployed separately and can be scaled up independent of the other. In particular, a pool of Device Communication Manager (DCM) microservice containers is responsible for accepting and managing the device connection. A pool of Device Operations Manager (DOM) microservice containers is responsible for providing interface for other microservices and applications to perform operations on device.

Asymmetric communication mechanisms are used within the NMS. For example, REST API calls to an API gateway using unique device identifiers as defined by the NMS for each managed element (e.g., UUIDs) as an HTTP cookie or HTTP header are used to route communications from the DCMs to the DOMs for delivery to higher-level NMS applications, thereby establishing session affinity through the API gateway with respect to the UUID. In the opposite direction, NMS applications invoke REST APIs on the DOMs passing the unique identifier for management element (UUID) into the HTTP header or HTTP cookie. Due to the session affinity, the API gateway automatically routes the REST calls to the appropriate DOMs due to the UUID constructed as part of the REST call as either an HTTP cookie or HTTP header. That is, for the same UUID, the API gateway routes the REST call to the same backend DOM container to which session management responsibilities were originally routed. Persistent communication sessions (e.g., HTTP2 sessions) are utilized within the NMS to bypass the API gateway and instead route communications with unique cookies directly to the DCMs from the DOMs so as to communicate commands and instructions from the NMS applications to the managed elements.

In one example, a network management system includes a set of one or more network management system (NMS) applications configured to execute on one or more processors. The NMS further includes a pool of device communication managers (DCMs), each of the DCMs executed by the processors as a software container, and each of the DCMs configured to accept and manage a management session to one of a plurality of managed element within a network. The NMS further comprises a pool of device operations managers (DOMs), each of the DOMs executed by the processors as a software container, and each of the DOMs configured to present an application programming interface (API) for performing operations on the managed elements according to device identifiers of the managed elements. An API gateway of the NMS is configured to route remote procedure calls (RPCs) from the DCMs to the DOMs via the APIs exposed by the DOMs and according to device identifiers of the managed elements as specified within the RPCs. The DOMs are configured to establish a set of persistent application-layer communication sessions from the DOMs to the DCMs, and to direct communications from the NMS applications to the DCMs over the persistent application-layer communication sessions according to a mapping between device identifiers associated with the managed elements and network addresses associated with the DCMs.

In another example, a method includes receiving a request to establish a management session from a managed element with a first one of a pool of device communication managers (DCMs), each of the DCMs executed by one or more processors of the NMS as a software container. The method includes, in response, issuing, via an application programming interface (API) gateway, a remote procedure call from the first DCMs to a first one of a pool of device operations managers (DOMs) executed by the one or more processors of the NMS, each of the DOMs executed by the processors of the NMS as a software container, and each of the DOMs configured to present an API for performing operations on the managed elements according to device identifiers of the managed elements. The method further comprises establishing, with the first DOM, a persistent application-layer communication session from the first DOM to the first DCMs; directing, with the first DOM, commands from a set of one or more NMS applications to the first DCMs over the persistent application-layer communication session according to a mapping between device identifiers associated with the managed elements and network addresses associated with the DCMs; and issuing the commands from the first DCM to the managed element via the management session.

In some examples, a computer-readable storage medium comprises instructions that, when executed, cause a processor of a network management system to implement the methods described herein.

The details of one or more examples are set forth in the accompanying drawings and the description below. Other features, objects, and advantages will be apparent from the description and drawings, and from the claims.

DETAILED DESCRIPTION

Figure 1:
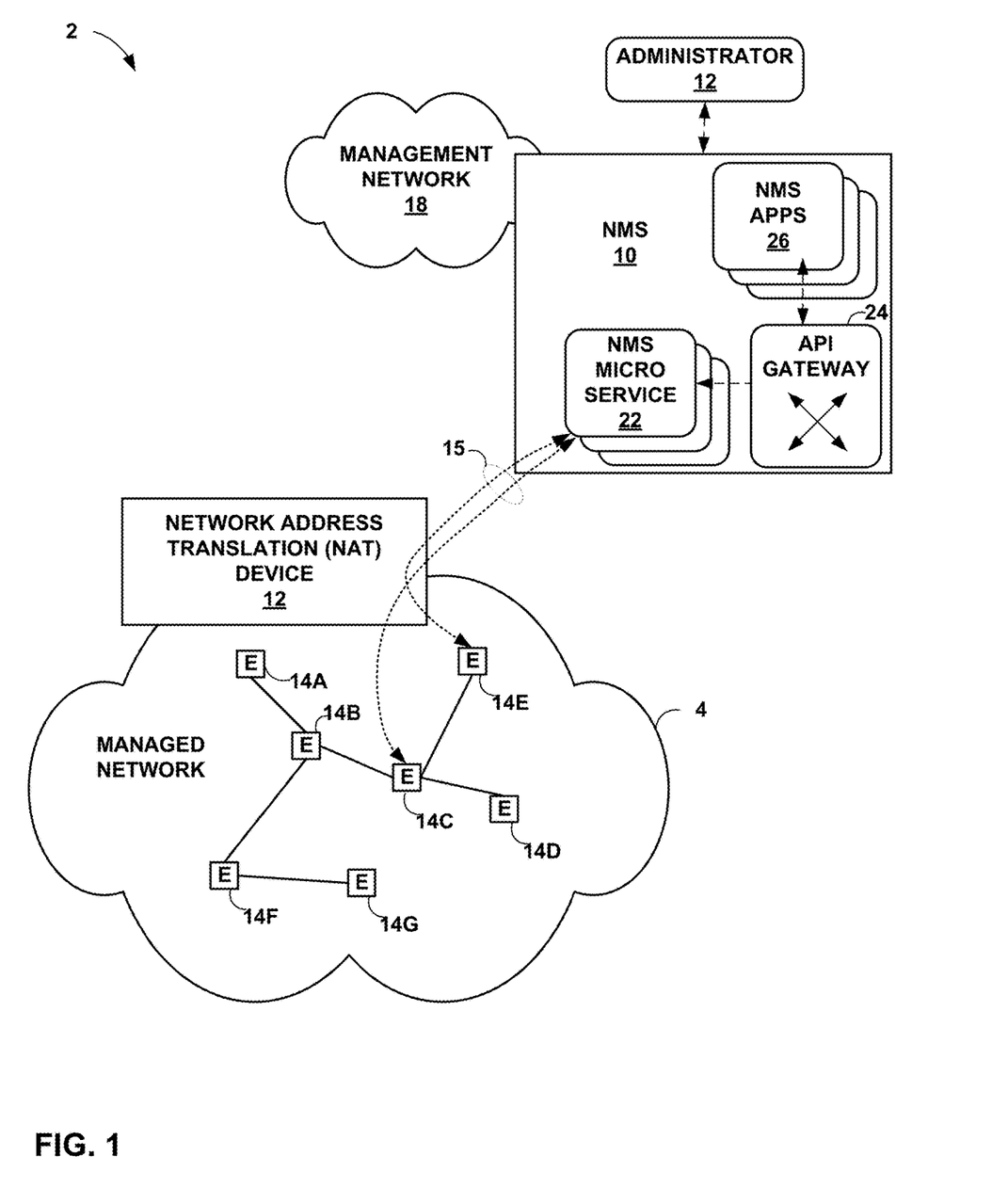
FIG. 1 is a block diagram illustrating an example cloud-based computing environment in which a network management system (NMS) manages a large scale of network elements.

FIG. 1 is a block diagram illustrating an example computing environment 2 including elements of a managed network 4 that are managed using a cloud-based network management system (NMS) 10 of management network 18. Managed elements 14A-14G (collectively, "elements 14") of network 2 include network devices interconnected via communication links to form a communication topology in order to exchange resources and information. Elements 14 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 14 may be physical links (e.g., optical, copper, and the like), wireless, or any combination thereof.

In general, administrator 12 interacts with NMS 10 to manage network elements 14 using one or more device management protocols. For example, administrator 12 interacts with NMS 10 to remotely monitor and configure elements 14. For example, administrator 12 may receive alerts from NMS 10 regarding any of elements 14, view configuration data of elements 14, modify the configurations data of elements 14, add new network devices to network 2, remove existing network devices from network 2, or otherwise manipulate the network 2 and network devices therein. One example device protocol used for communication between NMS 10 and network elements 14 is the Simple Network Management Protocol (SNMP) that allows NMS 10 to traverse and modify management information bases (MIBs) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

In some examples, administrator 12 uses NMS 10 or a local workstation to interact directly with elements 1 through respective management sessions 15, e.g., secure shell (SSH) sessions or other such communication sessions. That is, elements 14 generally provide interfaces for direct interaction, such as command line interfaces (CLIs), web-based interfaces, graphical user interfaces (GUIs), or the like, by which a user can interact with the devices to directly issue commands. For example, these interfaces typically allow a user to interact directly with the device to submit commands in accordance with a defined syntax. In addition, administrator 12 can also create scripts that can be submitted by NMS 10 to any or all of elements 14. For example, in addition to a CLI interface, elements 14 also provide interfaces for receiving scripts that specify the commands in accordance with a scripting language. In a sense, the scripts may be output by NMS 10 to automatically invoke corresponding remote procedure calls (RPCs) on the managed elements 14. The scripts may conform to, e.g., extensible markup language (XML) or another data description language.

Administrator 12 uses NMS 10 to configure elements 14 to specify certain operational characteristics that further the objectives of administrator 12. For example, administrator 12 may specify for an element 14 a particular operational policy regarding security, device accessibility, traffic engineering, quality of service (QoS), network address translation (NAT), packet filtering, packet forwarding, rate limiting, or other policies. NMS 10 uses one or more network management protocols designed for management of configuration data within managed network elements 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/html/rfc4741. NMS 10 may establish NETCONF sessions with one or more of elements 14.

In the example of FIG. 1, NMS 10 is cloud-based network management system separated from managed elements 10 by network address translation (NAT) device 12. In general, NAT device 10 translates the network addresses (IP addresses) within packets of packet flows associated with management sessions 15. For example, NAT device 10 as packets flow through NAT device 10, the NAT device may translate private network addresses of managed network 4 to public network addresses routable to management network 18. The term "packet flow," "traffic flow," or simply "flow" refers to a set of packets originating from a particular source device and sent to a particular destination device. A single flow of packets, in either the outbound (sourced by one of network elements 14) or inbound (destined for one of network elements 14) direction, may be identified by, for example, the 5-tuple: <source network address, destination network address, source port, destination port, protocol>. A pair of outbound packets and inbound packets (i.e., packet flows) may be part of the same communication session, such as one or management sessions 15. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

In some example implementations, NMS 10 provides a cloud-based, scalable, robust NMS system in which each of a plurality of NMS microservices 22 provide NMS services to respective managed elements 15 associated with each of plurality of management sessions 15. That is, each of NMS microservices 22 operates as an endpoint for a respective one of management sessions 15 and provides NMS services to the managed element 14 associated with the particular management session 15. For example, each of managed element 14 may initiate a management session 15 by, in one example, outputting a SSH session request to NMS 10. NMS microservices 22 listen for SSH session requests on respective ports advertised to managed network 4 by NMS 10 and process each SSH session request to establish a new one of management sessions 15.

To provide scalability, NMS 10 may maintain NMS microservices 22 as replicated, low-overhead virtual containers. When NMS 10 is configured to manage large numbers of managed elements 14, NMS 10 replicates containers NMS microservices 22 so as to provide a respective pool of NMS microservices for each port, thereby providing horizontal scaling. NMS applications 26 communicate with managed elements 14 by way of API gateway 24 to fetch configuration, deploy updated configuration or otherwise execute operational commands through the particular one of NMS microservices 22 to which the managed element 14 is connected. For example, NMS applications 26 may invoke remote procedure calls (RPCs) on particular NMS microservices 22 (e.g., containers) by passing, within the RPC, a specific device identifier for one of managed devices 14 and one or more operation to be executed on the managed device. In one example, NMS applications 26 may invoke NMS microservices 22 by issuing RPC calls in the form of HTTP Requests to API gateway 24 and constructing the HTTP Requests to include the unique device identifiers as HTTP cookies or as part of the HTTP header.

The techniques described herein provide technical solutions to various technical challenges that can otherwise exist in cloud-based NMS systems 2. For example, the techniques enable reliable management of managed devices 14 by in the cloud-based NMS 10, including technical solutions to the following challenges:

Horizontal scaling—New microservices 22 (e.g., containers) can be dynamically added when the number of managed elements 14 to manage increase and new managed elements start connecting to these newly added microservices (e.g., containers).

Microservice crash—If an NMS microservice 22 (e.g., container) crashes, all managed elements 14 connections to that container can be lost. Further, when management elements 14 originally connected to the crashed microservice reconnect, the sessions 15 can be assigned to the different one of NMS microservices 22, so the information learned by other micro-services about the association between that managed element and the original NMS microservice 22 is no longer valid.

Connection drop—If a particular management session 15 drops, when a managed element 14 re-initiates the connection the session can be assigned to the different one of NMS microservices 22, so the information learned by other micro-services about the association between that managed element and the original NMS microservice 22 is no longer valid.

New applications—New deployed NMS Applications 26 (after one or more managed elements 14 are connected) are typically forced to learn about a session mapping between a given one of NMS microservices 24 to a managed device 14 by either inefficiently querying each NMS microservice 24 responsible for managing device connections, which is not very efficient in large-scale networks, or by querying a centrally maintained cache of device-to-container mappings, which presents its own challenges in terms of maintenance of centralized cache.

Figure 2:
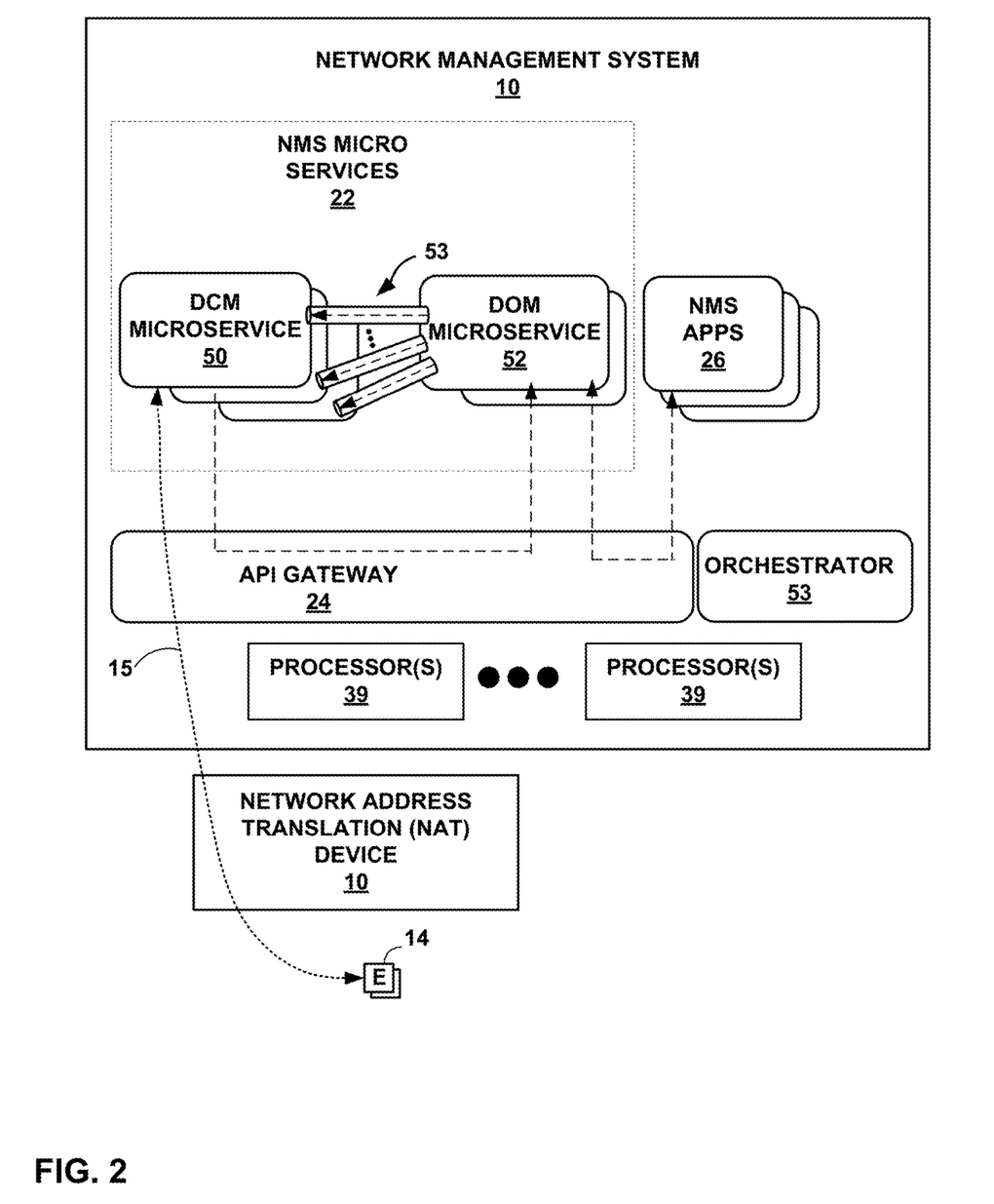
FIG. 2 is a block diagram illustrating an example set of components for the network management system of FIG. 1.

FIG. 2 is a block diagram illustrating an example architecture for NMS 10 of FIG. 1 in accordance with the principles of the invention. As shown in this example, NMS microservices 22 of NMS 10 include two types of microservices operating in tandem: Device Communication Managers (DCMs) 50 and Device Operations Managers (DOM) 52. Each of DCM 50 and DOM 52 may be executed by hardware processors 39 as a software container within a virtualized environment, and processors 39 may represent one or a plurality of servers or appliances.

DCMs 50 are responsible for communications with managed elements 14 through management sessions 15 and, in this example, NAT device 10. DCMs 50 may, for example, be configured as one or more pools of containers tasked with listening for connection requests from managed elements 14 on respective port. DOMs 52 are responsible for providing interface for other microservices and NMS applications 26 to perform operations on managed elements device 14. Individual DCMs 50 and DOMs 52 can be deployed separately with ability to scale up independent of each other depending upon whether current loading conditions require As further described below, the techniques utilize HTTP header-based and/or HTTP cookie-based session affinity mechanism within API Gateway 24. For example, DCMs 50 and NMS apps 26 are configured to communicate with DOMs 52 by invoking remote procedure calls through API gateway 24, where a given RPC call specifies a unique device identifier maintained within NMS 10 for a given managed element. Unique device identifiers are typically not public network address associated with management sessions 15 (given the presence of NAT device 12) but instead are unique ID utilized within a configuration database of NMS 10 for each device, such as device UUIDs for managed elements 14.

DOMs 52 are configured to establish a set of persistent application-layer communication sessions 53 (e.g., HTTP2 connection such as gRPC) from the DOMs to DCMs 50. That is, each DOM 50 establishes persistent application-layer communication session 53 to DCMs 52 for communicating with the particular managed elements 14 assigned to the DOM. Upon receiving an RPC from a DCM 50 to which a managed element 14 established a new management session 15, the receiving DOM 52 identifies a container hostname associated with one of DCMs 50 as specified within the RPC and resolves that hostname to an IP address as a destination address for application-layer communication sessions 53.

To resolve the hostname (container name) to an IP address, a DOM 52 may, for example, issue a request to orchestrator 55 responsible for deploying, restarting and terminating containers within the virtualized environment of NMS 10, including NMS microservices 22. That is, in some examples, container service orchestrator 53 provides a mechanism to resolve a container name to an IP address within the virtual environment. DOMs 52 are configured to direct communications (received via RPCs) from NMS applications 26 to DCMs 50 over the persistent application-layer communication sessions 53 according to a mapping between device identifiers (e.g., UUIDs) associated with the managed elements and network addresses associated with the container hostnames of the DCMs.

API gateway 24 is utilized to provide session affinity according to device UUID values specified within HTTP headers or Cookies carried by the RPC calls. For example, RPC calls through API gateway 24 may take the form of HTTP-based REST calls having unique cookies or headers. When the same device UUID value is set within a cookie or header of the RPC, as described herein, API gateway 24 routes the requests to same endpoint, i.e., the same particular container for that type of microservice.

As one example, API gateway 24 may be an NGINX Ingress Controller for Kubernetes, which is an open-source system for automating deployment, scaling, and management of containerized applications. In this example, a Kubernetes ingress policy can be configured in the following manner to provide a custom cookie-based session affinity between the device ID for managed element 14 and the particular DOM 52 selected by API gateway 24 to receive the RPC call, thereby allowing the API gateway to direct subsequent RPC calls with the same device ID to the same one of DOMs 52.

```
apiVersion: extensions/v1beta1
kind: Ingress
metadata:
  name: ngnix-ingress-dom
  annotations:
    kubernetes.io/ingress.class: "nginx"
    nginx.ingress.kubernetes.io/ssl-redirect: "false"
    nginx.ingress.kubernetes.io/rewrite-target: /$2
    nginx.ingress.kubernetes.io/affinity: "cookie"
    nginx.ingress.kubernetes.io/affinity-mode: "balanced"
    nginx.ingress.kubernetes.io/session-cookie-name:
      "X-Device-UUID"
spec:
  rules:
  - host: sticky.dom.com
    http:
      paths:
        - path: /dom(/|$)(.*)
        #- path: /dom
          backend:
            serviceName: dom-service
            servicePort: 80
```

In the above example, any request containing same value for cookie X-Device-UUID will be routed by API gateway 24 to the same endpoint. If the X-Device-UUID cookie is not set, ngnix generates one and returns to the client. If the X-Device-UUID cookie is already set in the first call, ngnix uses the value set by client to generate consistent hash and selection of endpoint.

As another example, API gateway 24 may be an Ambassador gateway, which is an open source, Kubernetes-native microservices API gateway. An Ambassador gateway can be configured in the following way to provide HTTP header-based session affinity:

```
- apiVersion: v1
  kind: Service
  metadata:
    name: dom-service
    annotations:
      getambassador.io/config:|
      ---
      apiVersion: getambassador.io/v1
      kind: Mapping
      name: dom_service_api_gateway
      prefix: /dom/service:
      dom-service:80
      resolver: endpoint
      load_balancer:
        policy: ring_hash
        header: X-Device-UUID
```

In the above example, any request containing same value of X-Device-UUID will be routed to the same endpoint.

Figure 3:
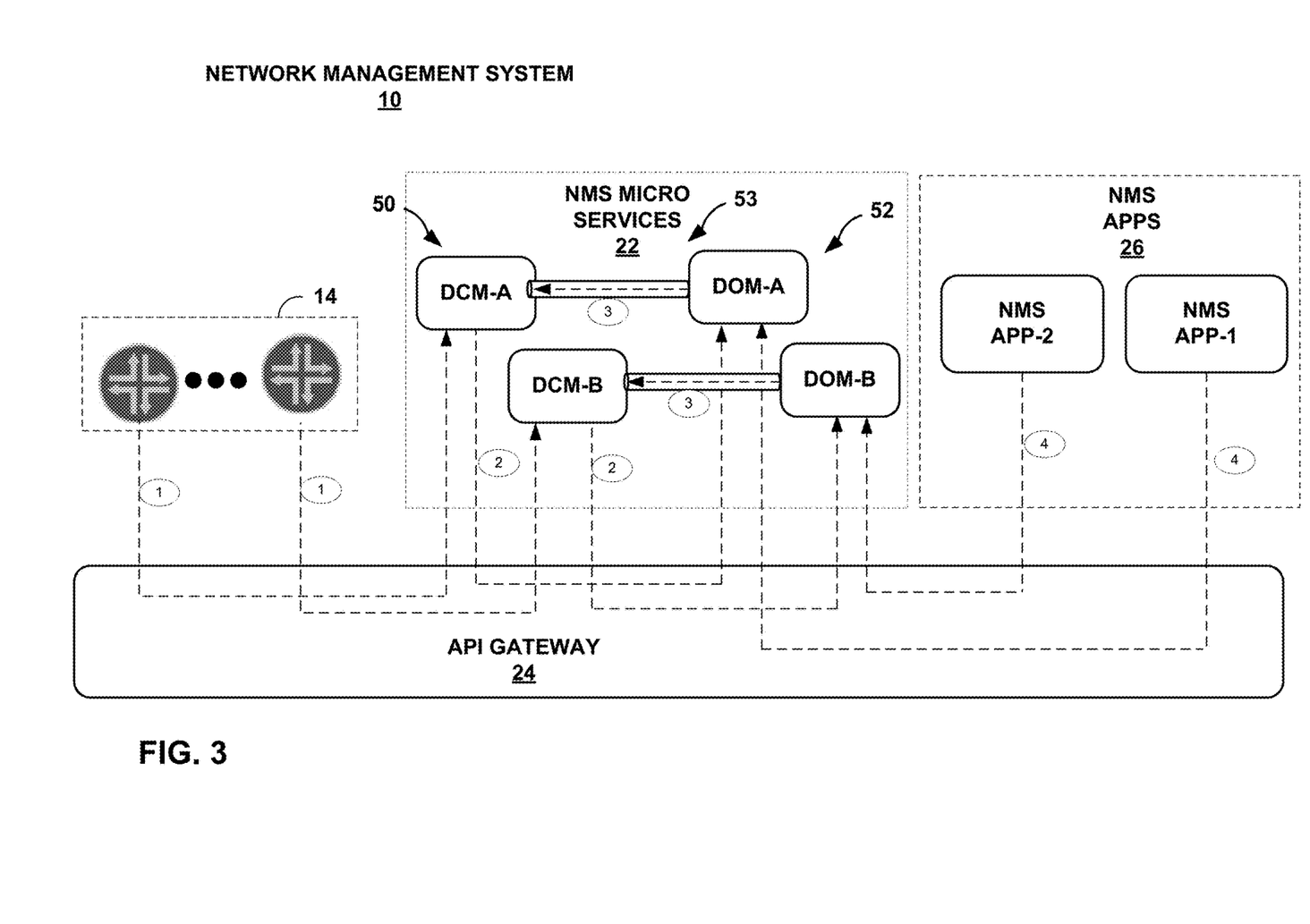
FIG. 3 is a block diagram illustrating process flow by the components for the network management system of FIGS. 1 and 2.

FIG. 3 is a block diagram illustrating example process flow by the components of NMS 10 of FIGS. 1 and 2. As shown in FIG. 3, managed elements 14 typically initiate an outbound SSH connection to NMS 10 (e.g., REST calls), which API gateway 24 directs to one of DCM containers 50 responsible for accepting the connection based on the particular port (STEP 1).

Next, the DCM 50 handling the management session request calls, via gateway 24, a DOM 52, e.g., via a REST API exposed as service. For example, when API gateway 24 is a nginx-ingress-controller, DCM 50 may make the following call:

```
POST: https://<gateway-ip>/dom/connection-up
COOKIE: {'X-Device-UUID': <uuid-of-connected-de-
   vice>}
BODY:
   {Hostname: Container-Name (or POD-Name in case of
      Kubernetes)}
```

When API gateway 24 is an ambassador API gateway, DCM 50 may make the following call:

```
POST: https://<gateway-ip>/dom/connection-up
HEADER: {'X-Device-UUID': <uuid-of-connected-de-
   vice>}
BODY:
   {Hostname: Container-Name (or POD-Name in case of
      Kubernetes)}
```

In these examples, 'hostname' represents the name of the container (or POD-Name in case of Kubernetes) on which connection is established (DCM-A or DCM-B in the example of FIG. 3). The UUID of the managed element 14 is a unique identifier used by NMS 10 to identify the managed element.

Generally, this unique identifier is passed by managed element 14 when it establishes the management session 15 with a DCM 50. For example, in one example device configuration, a managed device 14 sends device-id in an outbound connection request as follows:

```
client EMS-47b47bf5-d62e-4bff-a099-1b51f968c0a8{
    device-id        908a5a66-1ac4-4d44-a104-
        a329195dba66.JUNOS;
    secret "$9$KUV8LNbs2ZGiY24ZDjq"; ##SECRET-
        DATA
    keep-alive;
    services netconf;
    <mgmt-ip> port <mgmt-port>;
}
```

Next, in response to the REST API call by the receiving one of DCMs 50, one of DOM microservices 53 (such as DOM-A or DOM-B in FIG. 3) opens a persistent HTTP2 connection 53, e.g., by issuing a remote procedure call (e.g., gRPC) to the particular IP address corresponding to the hostname passed in by the handling DCM 50 (STEP 3). For example, container orchestrator 53 may be utilized to to resolve IP addresses of containers to hostnames. A Kubernetes orchestrator, for example, provides an API to fetch the details for a particular POD using the name of the POD. These retrieved details include the IP address of the POD. As one example, assume demo-deployment-744c659497-f5kdl is the POD name of the DCM-A. Resolution to host name may be performed by the following API call: curl -k https://<kube-apiserver-svc-ip>/api/v1/namespaces/default/pods/demo-deployment-744c659497-f5kdl. Upon resolving the hostname to a particular IP address of the DCM 50 handing the managed device, the DOM 52 opens a persistent connection to that DCM. In one example implementation, the DOM 52 opens one a single connection 53 per DCM. If a connection 53 is already opened between a DOM 52 and a given DCM 40, the DOM does not open a new connection.

In general, each of DCMs 50 and DOMs 52 maintain a map like one below to keep information about a persistent connection (e.g., gRPC connection id for an HTTP2 connection) and device-id mapping, where each device UUID represents a particular managed element 14 and each connection ID represents a particular persistent connection 53 between one of DCMs 50 and one of DOMs 52 for use in providing NMS services to the managed element 14. An example map is as follows:

```
device-uuid1 ←→ connection-1
device-uuid2 ←→ connection-1
device-uuid3 ←→ connection-2
device-uuid4 ←→ connection-2
```

To execute operations on a managed element 14 (STEP 4), any NMS application 26 issues an RPC call containing an X-Device-UUID (e.g., as a cookie or header) that the handing DCM 50 initially passed DOM 52. This ensures that the request from the NMS application 26 is directed by API gateway 24 to the particular one of (instance of) DOMs 52 which previously established the persistent connection to the particular DCM 52 to which the particular managed element 14 is connected.

For example, when using nginx-ingress-controller as an API gateway 24, a NMS application 26 may invoke the following example call, including the unique device identifier:

```
POST: https://<gateway-ip>/dom/execute-cmd
COOKIE: {'X-Device-UUID': <uuid-of-connected-de-
    vice>}
BODY:
{
    "cmd": <get-system-information></get-system-informa-
        tion>
    "format": "XML"
}
```

As another example, when using an ambassador api-gateway

```
POST: https://<gateway-ip>/dom/execute-cmd
HEADER: {'X-Device-UUID': <uuid-of-connected-de-
    vice>}
BODY:
{
    "cmd": <get-system-information></get-system-informa-
        tion>
    "format": "XML"
}
```

Figure 4:
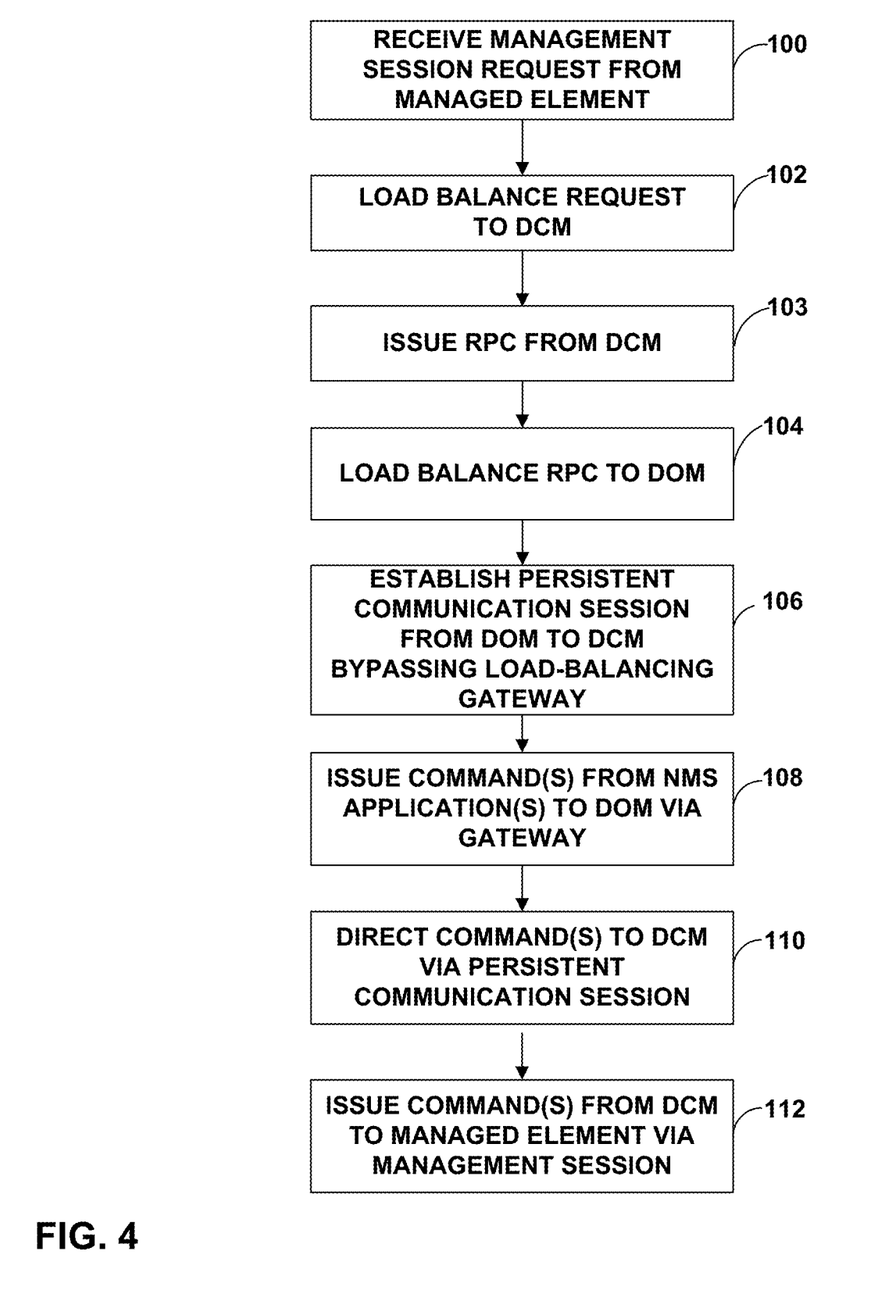
FIG. 4 is a flowchart illustrating example operation for a network management system according to the techniques described herein.

FIG. 4 is a flowchart illustrating example operation for a network management system according to the techniques described herein. Initially, NMS 10 receives a request for a management session 15 from one of managed elements 14 (100). For example, as explained above, in computing environments in which managed elements 14 operate behind a NAT device, the managed elements typically initiate a management session 15 by sending an outbound SSH connection to NMS 10 (e.g., in the form of a REST calls).

Upon receipt of a request for a new management session 15, API gateway 24 performs a load balancing operation to select one of DCM 50 software containers and direct the request to the selected DCM (102). For example, API gateway 24 may select a particular one of DCM containers 50 having a smallest current load (e.g., fewest number of active sessions), and/or may apply a hashing scheme to a device ID associated with the requesting managed element 14 to distribute the management sessions requests across DCMs 50 that operate as a pool of microservices. In this way, API gateway 24 helps enable scalability in a microservice-based NMS by load-balancing manage session requests across DCMs 50. As explained herein, each of DCMs 50 may be executed by the processors of NMS 10 as a software container, and each of the DCMs may be configured to accept and manage management sessions 15 from managed elements 14.

Upon receiving the request to establish a management session 15 from one of managed elements 14, the receiving DCM issues, via API gateway 24, a remote procedure call (e.g., a REST call) invoking an API exposed by DOMs 50 (103). API gateway 24 load balances the RPC across the pool of DOMs 52 (executing as microservice containers) to select one of the DOMs (104), further enabling scalability of NMS 10. As explained herein, each of DOMs 52 may be executed by the processors of NMS 10 as a software container, and each of the DOMs configured to present an API for performing operations on the managed elements according to device identifiers of the managed elements.

When load balancing the selection of DOMs 52 to service RPC calls from DCMs 50 (step 104 above), API gateway 24 records or otherwise uses the device identifier embedded in the RPC by the requesting DCM to provide session affinity with respect to the DOM 52 that was selected by the API gateway. That is, upon selecting one of DOMs 52 to service the RPC request from the requesting one of DCMs 50, API gateway 24 may record the device identifier in the initial RPC from the DCM for use as a mechanism for directing subsequent RPCs having the same device identifier to the selected DOM, where those RPCs may originate from either DCMs 50 or NMS applications 26. In other examples, API gateway 24 applies a hash function to the device identifier embedded in the RPCs from DCMs 50 and NMS applications 26 to ensure the appropriate DOM 52 handles RPCs for a given managed element 14.

In response to receiving the RPC from a DCM 50 establishing a management session 15, the DOM 53 selected by API gateway 24, in response, establishes a persistent application-layer communication session 53 directly from the DOM to the DCM that issued the RPC, thereby bypassing API gateway 24 (106). For example, the particular DOM 52 receiving the RPC via API gateway 24 may, in response, establish a persistent HTTP2 connection 53 directly to a particular IP address corresponding to the hostname received via the RPC. This may be advantageous in that bypassing API gateway 24 and instead utilizing persistent, point-to-point sessions from DOMs 52 to DCMs 50 ensures that communications from DOMs 52 flow to the correct DCMs 50 servicing the managed elements 14 and are not load-balanced across DCMs 50.

During operation, any of NMS applications 26 may issue commands to managed elements by issuing an RPC calls to APIs of DOMs 52 as exposed by API gateway 24 (108). At this time, API gateway 24 utilizes the unique device identifiers associated with managed elements 14 as embedded in the RPCs via NMS applications 26 to direct the RPCs to the appropriate DOMs 52, i.e., the DOMs to which the API gateway directed the original RPCs from DCMs 50 (steps 103, 104 above). In this way, the session affinity capabilities of API gateway 24 allow the API gateway to direct, based on device IDs of managed elements 14, RPCs from NMS applications 26 to the same DOMs selected by the API gateway to service RPCs from DCMs 50. As such, the techniques described herein ensure that NMS commands from NMS applications 26 are directed to DOMs 52 that have established persistent sessions 53 with the DCMs 50 necessary for communicating with the managed elements 14.

Upon receipt of the NMS commands from NMS applications 26, the receiving DOMs 52 direct the commands to the DCMs over persistent application-layer communication session 53 according to a mapping maintained by DOMs 52 between device identifiers associated with managed elements 14 and network addresses associated with DCMs 50 (110). In turn, DCMs 50 receive the commands from persistent connections 53 and issue the commands to managed element 14 via the management session.

Deployment Scaling

In general, the architecture described herein enables deployment of additional DCMs 50 as needed without reconfiguring or even informing NMS applications 26. That is, NMS applications 26 do not need to be programmatically reconfigured when new instances of DCMs 50 are instantiated. NMS applications 26 need only pass the correct header or cookie value, that is X-Device-UUID with the UUID of the device, to a DOM endpoint. The DOM endpoint is expected to, and responsible for, maintaining the persistent connection to the required one of DCMs 52 for the particular managed element associated with the UUID.

Further, when techniques such as consistent hashing are used as load balancing mechanisms by API gateway 24, redistribution of management sessions 15 happens across available DOMs 52, thus allowing the DOMs to be scaled as needed.

When scaling DOMs 52, loading of responsibility for managed elements 14 and corresponding persistent sessions 53 may be redistributed across the newly scaled DOMs. The following approach, as one example, can be used to restore session affinity between a particular device UUID and a DOM 52 responsible for maintaining the persistent session 53 for that particular managed element:

When a API request from an NMS application 26 is directed to a particular one of DOMs 52 and the particular DOM is no longer responsible for the connection 53 to the DCM 50 on which managed element is connected (due to change in affinity as a result of rescaling), the DOM writes that X-Device-UUID received in the call to a table of "ORPHAN DEVICES" and starts waiting for a call from a DCM 50.

Other DOMs 52 periodically read from each other tables of orphan devices and the DOM which is currently maintaining a persistent connection associated with that X-Device-UUID directs the corresponding one of DCMs 50 to issue a REST call via API gateway 24 to re-establish the affinity. As such, the original DOM will remove the device from its connection map and also remove the entry from orphan devices table The waiting DOM receives the new REST call from DCM and completes the operation requested by the NMS application.

Handling Microservice Container/POD Crashes

As described above, both parties of the gRPC connection maintain mapping between device Id and connection. If a particular one of DOM 52 crashes, the corresponding DCM 50 having a persistent connection 53 from the crashed DOM can re-play a log of REST APIs by issuing RPCs for all the device-uuids that were mapped to that connection. For each replayed RPC call, API gateway 24 will then establish a session affinity for that device-uuid with a different one of DOMs 52. Re-distributions of sessions can be handled using mechanism described above.

In the even a DCM 50 crashes, the corresponding DOM invalidates its cache for the connection 53 to the DCM 50 that has crashed. The managed element 14 will eventually issue a new connection request to NMS 10 and will be connected to a different DCM 50, which will invoke a REST API RPC call through API gateway 24 that will, in turn, create session stickiness once gain for that device-uuid to different DOM instance.

Handling connection drops: in such instances, a managed element 14 can reconnect to a DCM 50 and the DCM calls the REST API to the same DOM 52. As described above, API gateway 24 directs the REST API to the same DOM which originally was managing the device. In all these failure scenarios the recovery is transparent to the client applications.

As described herein, HTTP headers or Cookies can be used in the REST call within NMS 10 to establish session affinity/stickiness between device unique identifier and a micro-service container having connection to that device. This mechanism is used to establish the session stickiness for management of devices by NMS 10. Further, remote procedure calls (e.g., gRPC) for persistent connections are used to propagate session stickiness from low level microservices to the micro-services in the application layer.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A network management system comprising:
  one or more hardware-based processors;
  a set of one or more network management system (NMS) applications configured to execute on the processors;
  a pool of device communication managers (DCMs), each of the DCMs executed by the processors as a software container, and each of the DCMs configured to accept and manage a management session to one of a plurality of managed elements within a network;
  a pool of device operations managers (DOMs), each of the DOMs executed by the processors as a software container, and each of the DOMs configured to present an application programming interface (API) for performing operations on each of the managed elements according to device identifiers of the managed elements; and
  an API gateway configured to route remote procedure calls (RPCs) from the DCMs to the DOMs via APIs exposed by the DOMs and according to device identifiers of the managed elements as specified within the RPCs,
  wherein the DOMs are configured to establish a set of persistent application-layer communication sessions from the DOMs to the DCMs, and
  wherein the DOMs are configured to direct communications from the NMS applications to the DCMs over the persistent application-layer communication sessions according to a mapping between device identifiers associated with the managed elements and network addresses associated with the DCMs.

2. The network management system of claim 1, wherein the persistent application-layer communication sessions are Hyper Text Transfer Protocol version 2 (HTTP2) sessions originated from each of the DOMs and terminating on each of the DCMs.

3. The network management system of claim 1, wherein each DOM and each DCM is configured as a separate NMS microservice.

4. The network management system of claim 1, comprising a container service orchestrator configured to resolve a corresponding container name for each of the DOMs and each of the DCMs to a respective IP address.

5. The network management system of claim 1, wherein each of the DCMs is configured to embed a corresponding cookie within each of the RPCs issued to the DOMs, wherein each cookie specifies one of the device identifiers of the managed elements.

6. The network management system of claim 1,
  wherein the pool of DCMs and the pool of DOMs is dynamically scalable with respect to the number of software containers executing as DCMs and DOMs,
  wherein the DOMs are configured to maintain a table of orphan managed elements having device identifiers for which outbound communications from NMS applications have been received by the DOMs which, due to scaling, had not previously established the persistent application-layer communication sessions associated with the device identifiers.

7. The network management system of claim 6,
  wherein the DOMs are configured to scan the table of orphan managed elements and direct the DCMs associated with the device identifiers to reissue RPCs to the API gateway for routing to the DOMs.

8. A method executed by a network management system (NMS) comprising:
  receiving a request to establish a management session from a managed element with a first DCM of a pool of device communication managers (DCMs), each of the DCMs executed by one or more processors of the NMS as a software container, the managed element comprising one of a plurality of managed elements within a network;
  issuing, via an application programming interface (API) gateway, a remote procedure call (RPC) from the first DCM to a first device operations manger (DOM) of a pool of DOM executed by the one or more processors of the NMS, each of the DOMs executed by the processors of the NMS as a software container, and each of the DOMs configured to present an API for performing operations on each of the managed elements according to device identifiers of the managed elements;
  establishing, with the first DOM, a persistent application-layer communication session from the first DOM to the first DCMs;
  directing, with the first DOM, commands from a set of one or more NMS applications to the first DCMs over the persistent application-layer communication session according to a mapping between device identifiers associated with the managed elements and network addresses associated with the DCMs; and
  issuing the commands from the first DCM to the managed element via the management session.

9. The method of claim 8, further comprising routing, with the API gateway, remote procedure calls (RPCs) from the DCMs to the DOMs according to device identifiers of the managed elements as specified within the RPCs.

10. The method of claim 8, further comprising maintaining a table of orphan managed elements having device identifiers for which outbound communications from NMS applications have been received by at least one of the DOMs that, due to scaling of a total number of the DOMs in the pool of DOMs, has not previously established a persistent application-layer communication session associated with the device identifiers of the orphan managed elements.

11. The method of claim 10, further comprising scanning the table of orphan managed elements and directing the DCMs having managed sessions associated with the device identifiers listed in the table to reissue, to the API gateway, RPCs for routing to the DOMs so as to cause the DOMs to establish persistent application-layer communication sessions for the managed elements having the device identifiers listed in the table.

12. A computer-readable storage medium comprising instructions that, when executed, cause a processor of a network management system (NMS) to:
receive a request to establish a management session from a managed element with a first one of a pool of device communication managers (DCMs), each of the DCMs executed by one or more processors of the NMS as a respective software container;
issue, via an application programming interface (API) gateway, a remote procedure call from the first DCM to a first one of a pool of device operations managers (DOMs) executed by the one or more processors of the NMS, each of the DOMs executed by the one or more processors of the NMS as a respective software container, and each of the DOMs configured to present an API for performing operations on the managed elements according to device identifiers of the managed elements;
establish, with the first DOM, a persistent application-layer communication session from the first DOM to the first DCM;
direct, with the first DOM, commands from a set of one or more NMS applications to the first DCM over the persistent application-layer communication session according to a mapping between device identifiers associated with the managed elements and network addresses associated with the DCMs; and
issue the commands from the first DCM to the managed element via the management session.

13. A network system comprising:
a plurality of managed elements within a network;
a network management system comprising:
one or more hardware-based processors;
a set of one or more network management system (NMS) applications configured to execute on the processors;
a pool of device communication managers (DCMs), each of the DCMs executed by the processors as a software container, and each of the DCMs configured to accept and manage a management session for one of the plurality of managed elements;
a pool of device operations managers (DOMs), each of the DOMs executed by the processors as a software container, and each of the DOMs configured to present an application programming interface (API) for performing operations on the plurality of managed elements according to device identifiers of the plurality of managed elements;
an API gateway configured to route remote procedure calls (RPCs) from the DCMs to the DOMs via APIs exposed by the DOMs and according to device identifiers of the plurality of managed elements as specified within the RPCs,
wherein the DOMs are configured to establish a set of persistent application-layer communication sessions from the DOMs to the DCMs, and
wherein the DOMs are configured to direct communications from the NMS applications to the DCMs over the persistent application-layer communication sessions according to a mapping between device identifiers associated with the plurality of managed elements and network addresses associated with the DCMs; and
a network address translation (NAT) device positioned between the NMS and the plurality of managed elements.

* * * * *

UNITED STATES PATENT AND TRADEMARK OFFICE
CERTIFICATE OF CORRECTION

| | |
|---|---|
| PATENT NO. | : 11,075,792 B2 |
| APPLICATION NO. | : 16/803935 |
| DATED | : July 27, 2021 |
| INVENTOR(S) | : Raviraj Satish Deshmukh et al. |

It is certified that error appears in the above-identified patent and that said Letters Patent is hereby corrected as shown below:

In the Claims

Column 14, Line 50 (Claim 8): Replace "pool of DOM executed" with --pool of DOMs executed--

Signed and Sealed this
Second Day of May, 2023

Katherine Kelly Vidal
*Director of the United States Patent and Trademark Office*